United States Patent
Ye et al.

(10) Patent No.: US 11,853,549 B2
(45) Date of Patent: Dec. 26, 2023

(54) INDEX STORAGE IN SHINGLED MAGNETIC RECORDING (SMR) STORAGE SYSTEM WITH NON-SHINGLED REGION

(71) Applicant: Hangzhou Hikvision System Technology Co., Ltd., Zhejiang (CN)

(72) Inventors: Min Ye, Zhejiang (CN); Wei Wang, Zhejiang (CN); Qiqian Lin, Zhejiang (CN)

(73) Assignee: Hangzhou Hikvision System Technology Co., Ltd., Zhejiang (CN)

( * ) Notice: Subject to any disclaimer, the term of this patent is extended or adjusted under 35 U.S.C. 154(b) by 51 days.

(21) Appl. No.: 17/780,334

(22) PCT Filed: Nov. 26, 2020

(86) PCT No.: PCT/CN2020/131816
§ 371 (c)(1),
(2) Date: May 26, 2022

(87) PCT Pub. No.: WO2021/104380
PCT Pub. Date: Jun. 3, 2021

(65) Prior Publication Data
US 2022/0413706 A1   Dec. 29, 2022

(30) Foreign Application Priority Data
Nov. 27, 2019   (CN) .......................... 201911181875.5

(51) Int. Cl.
G06F 3/06 (2006.01)
G11B 20/12 (2006.01)

(52) U.S. Cl.
CPC .......... *G06F 3/0608* (2013.01); *G06F 3/0644* (2013.01); *G06F 3/0652* (2013.01);
(Continued)

(58) Field of Classification Search
CPC .... G06F 3/0608; G06F 3/0644; G06F 3/0652; G06F 3/0676; G11B 20/1217; G11B 2020/1238
See application file for complete search history.

(56) References Cited

U.S. PATENT DOCUMENTS 10,446,174 B2 * 10/2019 Das .......................... G11B 5/012
2012/0300326 A1 * 11/2012 Hall ........................ G11B 5/012
(Continued)

FOREIGN PATENT DOCUMENTS

CN   104216957 A   12/2014
CN   104461390 A   3/2015
(Continued)

OTHER PUBLICATIONS

Jones et al., Classifying Data to Reduce Long-Term Data Movement in Shingled Write Disks, ACM Transactions on Storage, Feb. 2016, vol. 12, No. 1, Art. 2, p. 1-17.
(Continued)

*Primary Examiner* — William E. Baughman
(74) *Attorney, Agent, or Firm* — Bret E. Field; Bozicevic, Field & Francis LLP

(57) ABSTRACT

The present application provides a data storage method, a data storage apparatus and a storage system, wherein the method includes: determining a data type of to-be-stored data when the to-be-stored data is obtained (S410); determining a target storage area with a data type same as that of the to-be-stored data based on the data type of data stored in each storage area in the SMR disk (S420); determining in the target storage area a target storage block into which the to-be-stored data is to be written (S430); generating the main index information and backup index information of the to-be-stored data based on the identifier of the target storage block (S440); generating the database index information of the to-be-stored data based on the to-be-stored data and the
(Continued)

identifier of the target storage block (S450); and writing the to-be-stored data and the backup index information of the to-be-stored data into the target storage block, writing the main index information of the to-be-stored data into the CMR area or the non-SMR disk, and writing the database index information of the to-be-stored data into the non-SMR.

18 Claims, 5 Drawing Sheets

(52) U.S. Cl.
CPC ........ *G06F 3/0676* (2013.01); *G11B 20/1217* (2013.01); *G11B 2020/1238* (2013.01)

(56) References Cited

U.S. PATENT DOCUMENTS

| 2012/0303928 | A1 | 11/2012 | Hall |
| 2017/0124104 | A1 | 5/2017 | Smith et al. |
| 2017/0277438 | A1 | 9/2017 | Gole et al. |
| 2018/0018235 | A1 | 1/2018 | Arslan et al. |
| 2018/0342261 | A1 | 11/2018 | Das |
| 2019/0244638 | A1* | 8/2019 | Boyle ...................... G11B 5/09 |
| 2019/0317698 | A1* | 10/2019 | Pu .......................... G06F 3/0616 |
| 2021/0334206 | A1* | 10/2021 | Colgrove .............. G06F 3/0638 |

FOREIGN PATENT DOCUMENTS

| CN | 106201355 A | 12/2016 |
| CN | 106548789 A | 3/2017 |
| CN | 108021513 A | 5/2018 |
| CN | 108062200 A | 5/2018 |
| CN | 108255408 A | 7/2018 |
| CN | 109254733 A | 1/2019 |
| CN | 110149803 A | 8/2019 |
| CN | 110502455 A | 11/2019 |
| CN | 111399762 A | 7/2020 |

OTHER PUBLICATIONS

Park et al., Hot Data Identification with Multiple Bloom Filters: Block-Level Decision vs I/O Request-Level Decision, Journal of Computer Science and Technology, Jan. 2018, vol. 33, No. 1, p. 79-97.

Lin et al., H-SWD: Incorporating Hot Data Identification into Shingled Write Disks, 2012 IEEE 20th International Symposium on Modeling, Analysis and Simulation of Computer and Telecommunication Systems, 2012, p. 321-330.

* cited by examiner

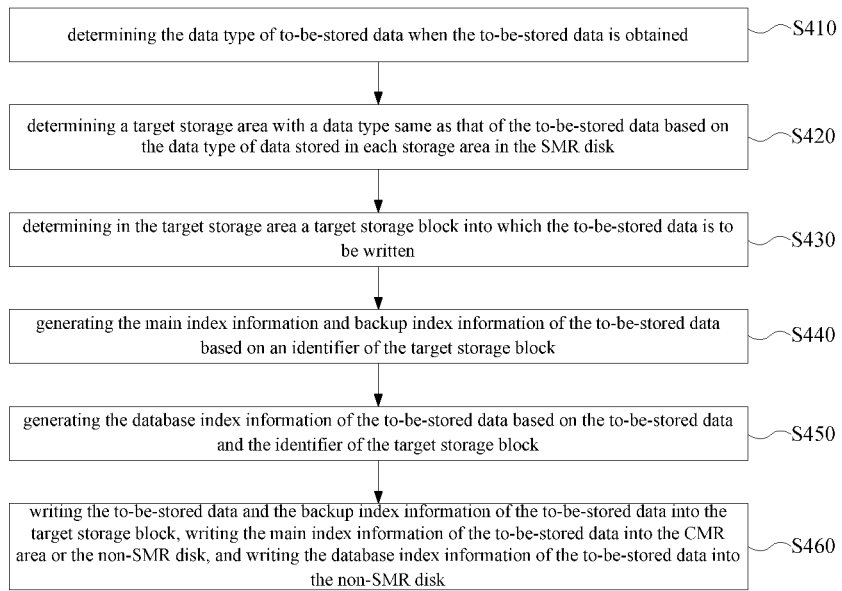
FIG. 4
| Video data 1 | Video data 2 | Video data 3 | ...... | Video data N-3 | Video data N-2 | Video data N-1 |
FIG. 5a
| Video index data 1 | Video index data 2 | Video index data 3 | ...... | Video index data N-3 | Video index data N-2 | Video index data N-1 |
FIG. 5b
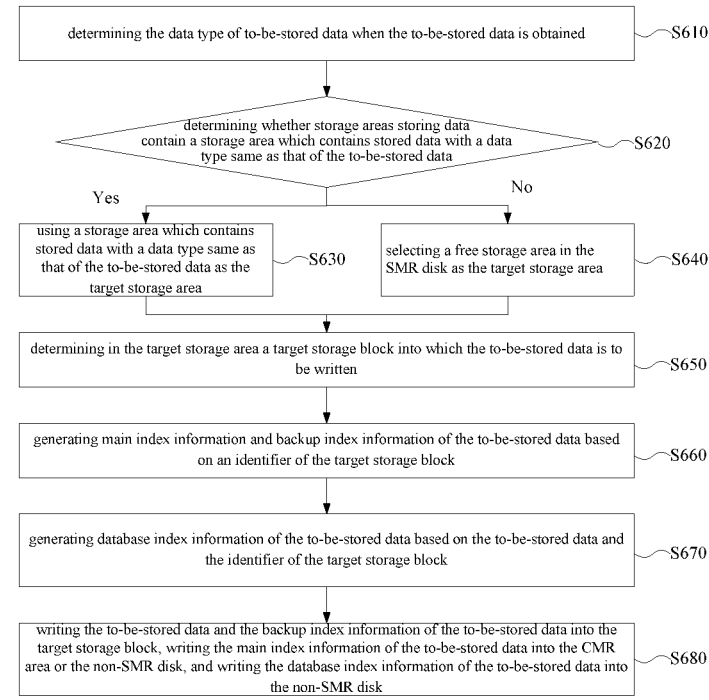
FIG. 6

INDEX STORAGE IN SHINGLED MAGNETIC RECORDING (SMR) STORAGE SYSTEM WITH NON-SHINGLED REGION

The present application claims the priority to a Chinese patent application No. 201911181875.5 filed with the China National Intellectual Property Administration on Nov. 27, 2019 and entitled "Data storage method, apparatus and storage system", which is incorporated herein by reference in its entirety.

TECHNICAL FIELD

The present application relates to the technical field of data storage, and in particular, to a data storage method, apparatus and storage system.

BACKGROUND

With the development of information technology, various electronic devices will generate a large amount of data. In order to analyze and process the data regularly, it is necessary to store the data in a storage medium, such as a floppy disk, an optical disk, a magnetic disk, a flash memory, a U drive (USB flash drive), a SM (Smart Media) card, a memory stick, etc., wherein USB is the abbreviation of Universal Serial Bus.

In order to allow a single disk to store more data, SMR (Shingled Magnetic Recording) disks appear in the prior art. In SMR disks, the data tracks are partially overlapped like tiles on a roof, so that when writing data, more tracks can be accommodated in the same area, thereby increasing the storage areal density and increasing the storage capacity of a single disk.

However, the inventor found that, in the prior art, the data to be written is usually written to the SMR disk according to the sequence of the received data writing instructions. Since a storage area of an SMR disk can only be written sequentially, when frequent overwrite operations are performed on the same data in a storage area of the SMR disk, only the last storage block in the storage blocks in this storage area storing the data stores valid data, and the data stored in other storage blocks is invalid data, and the storage block in this storage area does not support delete operations, which may easily lead to a large number of fragments in the SMR disk. If these fragments cannot be recovered in time, the storage resource utilization of the SMR disk is not high.

SUMMARY

The purpose of the embodiments of the present application is to provide a data storage method and apparatus, and a storage system, so as to improve the storage resource utilization of the SMR disk. Specifically, the technical solutions are as follows.

In a first aspect, an embodiment of the present application provides a data storage method, which is applied to an SMR (shingled magnetic recording) storage system, wherein the SMR storage system includes an SMR disk and a non-SMR disk; the SMR disk includes a CMR (conventional magnetic recording) area and an SMR area, the SMR area includes multiple storage areas, each of which is logically divided into multiple storage blocks; the method includes: determining a data type of to-be-stored data when the to-be-stored data is obtained; determining a target storage area with a data type same as that of the to-be-stored data based on a data type of data stored in each storage area in the SMR disk; determining in the target storage area a target storage block into which the to-be-stored data is to be written; generating main index information and backup index information of the to-be-stored data based on an identifier of the target storage block; generating database index information of the to-be-stored data based on the to-be-stored data and the identifier of the target storage block; writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

In a second aspect, an embodiment of the present application further provides a data storage apparatus, which is applied to a SMR (shingled magnetic recording) storage system, wherein the SMR storage system includes an SMR disk and a non-SMR disk; the SMR disk includes a CMR (conventional magnetic recording) area and an SMR area, the SMR area includes multiple storage areas, each of which is logically divided into multiple storage blocks; the apparatus includes: a first data type determining module, configured for determining a data type of to-be-stored data when the to-be-stored data is obtained; a target storage area determining module, configured for determining a target storage area with a data type same as that of the to-be-stored data based on a data type of data stored in each storage area in the SMR disk; a target storage block determining module, configured for determining in the target storage area a target storage block into which the to-be-stored data is to be written; a first index information generating module, configured for generating main index information and backup index information of the to-be-stored data based on an identifier of the target storage block; a second index information generating module, configured for generating database index information of the to-be-stored data based on the to-be-stored data and the identifier of the target storage block; a storage module, configured for writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

In a third aspect, an embodiment of the present application further provides an electronic device, including a processor, a communication interface, a memory, and a communication bus, wherein the processor, the communication interface, and the memory communicate with each other through the communication bus; the memory is configured for storing computer program; and the processor is configured for implementing the method steps of the first aspect when executing the program stored on the memory.

In a fourth aspect, an embodiment of the present application further provides a computer readable storage medium that stores computer program which, when executed by a processor, causes the processor to implement the method steps of any one of claims 1-8.

In a fifth aspect, an embodiment of the present application also provide an SMR storage system which includes: an SMR disk, a non-SMR disk, and a processor, the SMR disk includes a CMR area and an SMR area, and the SMR area includes multiple storage areas, each storage area is logically divided into multiple storage blocks; the storage blocks are configured for storing to-be-stored data and backup index information of the to-be-stored data; the CMR area is configured for storing main index information of the to-be-stored data; the non-SMR disk is configured for storing database index information of the to-be-stored data; the processor is configured for implementing the data storage method of the first aspect at runtime.

In a sixth aspect, an embodiment of the present invention further provides a computer program product including instructions which, when executed by a processor, cause the processor to implement the method steps of the above-mentioned first aspect.

In the data storage method, apparatus, electronic device, storage medium and storage system provided by the embodiments of the present application, the data type of to-be-stored data can be determined when the to-be-stored data is obtained; a target storage area with a data type same as that of the to-be-stored data can be determined based on the data type of the data stored in each storage area in the SMR disk; a target storage block into which the to-be-stored data is to be written is determined in the target storage area; after the target storage area is determined, main index information and backup index information of the to-be-stored data can be generated based on the identifier of the target storage block; database index information of the to-be-stored data is generated based on the to-be-stored data and the identifier of the target storage block; and finally, the to-be-stored data and the backup index information of the to-be-stored data can be written into the target storage block, the main index information of the to-be-stored data can be written into the CMR area or the non-SMR disk, and the database index information of the to-be-stored data can be written into the non-SMR disk. In this way, the data of the same data type can be stored in the same storage area. Since the data of the same data type usually has the same or similar frequency of overwriting operations, the storage of data with the same or similar overwriting operations in the same storage area can facilitate timely recycling of fragments generated in the storage area according to the frequency of overwriting operations of the data to reduce the number of fragments, thereby improving the storage resource utilization of the SMR disk.

Wherein, the main index information of the to-be-stored data is written into the CMR area or non-SMR disk, and the database index information of the to-be-stored data is written into the non-SMR disk. Since the CMR area or non-SMR disk supports delete operations, when the main index information and database index information of the to-be-stored data are updated, the main index information stored in the CMR area or the non-SMR disk and the database index information stored in the non-SMR disk can be directly located, thereby updating the stored main index information and the database index information without frequent overwriting operations on the main index information and database index information according to the sequential writing operation, thus, the invalid data in the SMR disk can be greatly reduced, and the storage resource utilization of the SMR disk can be improved.

It should be understood that any product or method for implementing the embodiments of the present disclosure does not necessarily require all of the advantages described above.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

FIG. 4 is a flowchart of a first implementation of a data storage method according to an embodiment of the present application;

FIG. 5a is a schematic diagram of a storage area that stores video data in an embodiment shown in FIG. 4;

FIG. 5b is a schematic diagram of a storage area that stores video index data in an embodiment shown in FIG. 4;

FIG. 6 is a flowchart of a second implementation of a data storage method according to an embodiment of the present application;

DETAILED DESCRIPTION

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All other embodiments obtained by those of ordinary skills in the art based on the embodiments herein without any creative efforts are within the scope of the present application.

Figure 1:
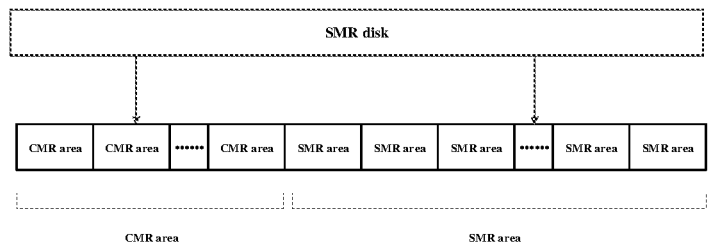
FIG. 1 is a schematic diagram of an SMR disk in the related art.

In the related art, in order to increase the reading and writing efficiency of an SMR disk, the HM (Host Manage) SMR technology is adopted. Referring to FIG. 1, an HM SMR disk is divided into two storage areas (i.e., a CMR area and an SMR area). The SMR area includes multiple storage areas, and the CMR area supports random reading and writing. Each storage area in the SMR area only supports sequential writing, and parallel writing is supported between multiple storage areas. Each storage area in the SMR area has a write pointer inside, each write operation starts from the write pointer, and the write operations are aligned according to physical sector sizes, a single read-write operation cannot span multiple storage areas, and the storage area in which data has been written must be reset before the next multiplexing write. After the HM SMR disk exposes the storage area and write pointer, application layer software can directly manage the complete life cycle of the storage area, including the sequential writing of data in the storage area, and the recovery and reset of the storage area.

In the security industry, video data, pictures, and audio data are referred to as streaming data. The streaming data has the characteristics of large data volume, more writing than reading, and faster coverage frequency. In project applications, when storing streaming data, it is necessary to perform a large number of new data writing and expired data deletions, and it is necessary to deal with the hardware cost problem caused by the storage of a large number of streaming data. Since the SMR disk have the characteristics of high storage density, it is very suitable for the security industry.

However, since one storage area of an SMR disk can only be written sequentially, when frequent overwriting operations are performed on the same data in one storage area of the SMR disk, in the storage blocks storing the data, only the data stored in the last storage block is valid data, and this data stored in other storage blocks is invalid data, and the storage blocks in this storage area do not support delete operations, which may easily lead to a large number of fragments of the SMR disk. If these fragments cannot be recovered in time, the storage resource utilization of the SMR disk will not be high.

Wherein, in order to facilitate the understanding of the above-mentioned frequent overwriting operations on the same data in one storage area of the SMR disk, a specific embodiment will be described below.

In the security industry, when video data is stored, video index data for the video data is stored. In this way, as time progresses, the video index data for the video data will change accordingly. Therefore, it is necessary to sequentially write in a storage area of the SMR disk the video index data that changes with time.

For example, when starting to store video data, the video index data A is written in a storage area of the SMR disk, and after a time period of t, in a storage area of the SMR disk, the video index data B is sequentially written in a storage space adjacent to the storage space in which the video index data A is stored, wherein, the time of the video data recorded in the video index data B has changed relative to the video index data A; further, after another time period of t, in a storage area of the SMR disk, the video index data C is sequentially written in a storage space adjacent to the storage space in which the video index data B is stored, wherein, the time of the video data recorded in the video index data C has changed relative to the video index data B; in this way and so forth, frequent overwriting operations on the same data in a storage area of the SMR disk can be implemented.

In view of this, the embodiments of the present application provide a data storage method, apparatus, electronic device, storage medium and storage system, so as to improve the storage resource utilization of the SMR disk.

Figure 2:
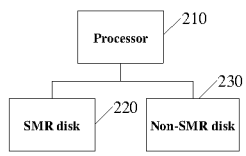
FIG. 2 is a schematic structural diagram of a data storage system according to an embodiment of the application.

Next, the SMR storage system according to an embodiment of the present invention is first introduced. As shown in FIG. 2, which is a schematic structural diagram of the SMR storage system according to an embodiment of the present application, the SMR storage system may include a processor 210, an SMR disk 220 and a non-SMR disk 230, the SMR disk includes a CMR area and an SMR area, the SMR area includes multiple storage areas, each of which is logically divided into multiple storage blocks.

The storage block in the SMR disk 220 is configured for storing to-be-stored data and the backup index information of the to-be-stored data.

The CMR area in the SMR disk 220 is configured for storing the main index information of the to-be-stored data.

The non-SMR disk 230 is configured for storing the database index information of the to-be-stored data.

The processor 210 is configured for implementing any one of embodiments of the data storage method of the present application at runtime.

Figure 3A:
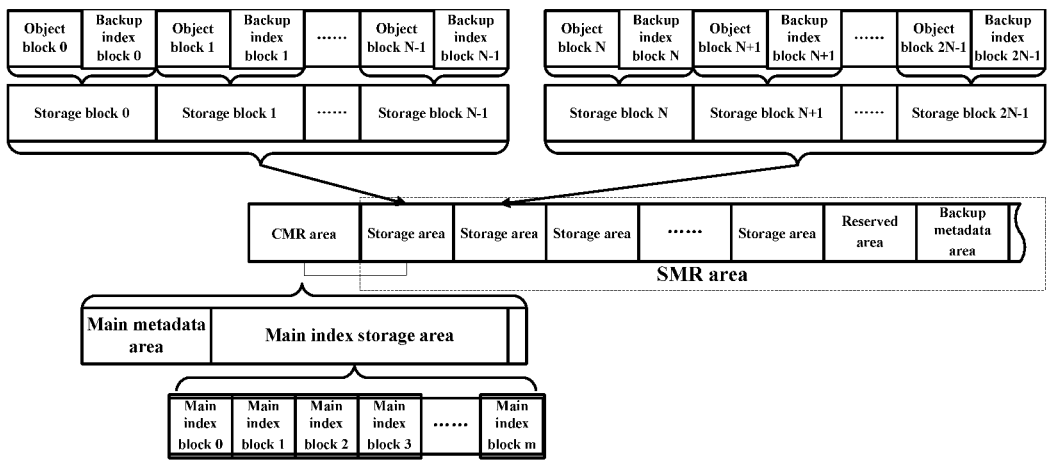
FIG. 3a is a schematic diagram of an SMR area in an SMR disk according to an embodiment of the application.

In some examples, as shown in FIG. 3*a*, the SMR disk may include a CMR area and an SMR area, the SMR area includes multiple storage areas, each of which is logically divided into multiple storage blocks.

As shown in FIG. 3*a*, the SMR area includes a storage area, a backup metadata area and a reserved area. Wherein, the storage area is configured for storing object data and backup index information corresponding to the object data. Specifically, the object data and the backup index information of the object data are stored in the storage block of the storage area.

In some examples, each storage block includes an object block and a backup index block. The object data is stored in the object block, and the backup index information of the object data is stored in the backup index block. Generally, a storage area is divided into multiple object blocks and multiple backup index blocks, and each object block is followed by one backup index block as one backup index block corresponding to the object block. The backup metadata area is configured for storing backup metadata information. The reserved area is configured as an intermediate medium when the object block is recycled.

As shown in FIG. 3*a*, the CMR area includes a main metadata area and a main index storage area, wherein the main index storage area is divided into multiple main index blocks. Wherein the main metadata area is configured for storing main metadata information. The main index storage area is configured for storing the main index information that is mutually backed up with the backup index information, and the main index information is stored in a main index block. Then, for any object block in the storage area of the above-mentioned SMR area, it has a main index block corresponding to the object block in a main index area in addition to a corresponding backup index block in the SMR area.

Wherein, the SMR disk may have metadata information for describing its own structural properties. In addition, in order to prevent the metadata information of the SMR disk from being lost after the CMR area is damaged, two copies of metadata information including main metadata information and backup metadata information can be generated.

The above-mentioned main metadata information and backup metadata information are consistent in content and mutually backed up, and may include information such as the size of the CMR area, the size of the SMR area, the number of storage areas in the SMR area, the size of a single main/backup index block, the size of a single object block, initialization time of a file system, and the total number of available blocks in a file system. In a specific application, the last storage area in the SMR area can be used as a backup metadata area to store the backup metadata information, so that the metadata information can be prevented from being lost after the CMR area is damaged. The main index information and the backup index information corresponding to any one object block are consistent in content and mutually backed up.

Figure 3B:
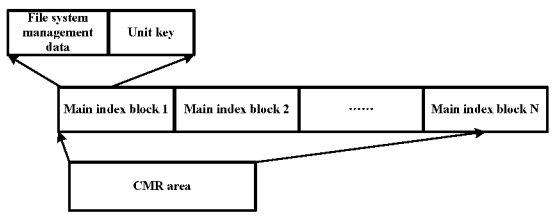
FIG. 3b is a schematic diagram of a main index block in a CMR area of an SMR disk according to an embodiment of the application.

FIG. 3*b* is a storage structural diagram of the main index storage area in the CMR area. It may include file system management data and Unit_key.

Wherein, Unit_key is a unit key corresponding to an object block of a storage area in the SMR area. The so-called unit key value can be understood as a set of key-value pairs corresponding to the stored data stored in the object block.

The file system management data may include an object block number, the length of Unit_key, the storage status of the object block (for example, free, used, or deleted, etc.), the length of the valid data stored in the object block, and the check value of the data stored in the object block, the write time of the object block. Wherein, the write time of the object block refers to the time at which the object data is written in the object block.

The main index storage area may include one main index storage area, or may include multiple consecutive main index storage areas. As shown in FIG. 3b, each main index storage area may include multiple main index blocks, and the main index blocks (main index block 1 to main index block N) are continuously distributed. That is, for a storage area in the SMR area, the main index information corresponding to each object block in the storage area is continuously stored in the main index storage area.

Figure 3C:
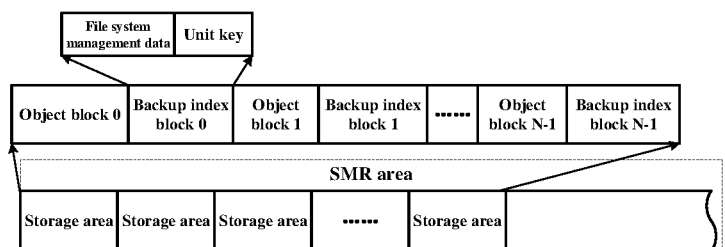
FIG. 3c is a schematic diagram of a backup index block in an SMR area of an SMR disk according to an embodiment of the application.

As shown in FIG. 3c, the backup index block in each storage block in the SMR area may also include file system management data and Unit_key, so that the backup index block corresponds to the main index block in FIG. 3b.

It can be seen from FIGS. 3b and 3c that the continuous storage of each main index block refers to that for multiple continuous storage blocks in a storage area in the SMR area, the backup index information stored in the backup index blocks in the multiple storage blocks is also continuously stored according to the multiple consecutive main index blocks in the main index storage area in the CMR area.

Generally, streaming data is stored as object data in an object block in the storage area of the SMR area. Each object block corresponds to main index information and backup index information that are consistent in content and mutually backed up, wherein, the main index information is stored in the main index storage area of the CMR area, the backup index information is stored in the storage area of the SMR area. In some examples, the non-SMR disk may include a solid state drive.

Next, a data storage method according to an embodiment of the present application is introduced. As shown in FIG. 4, it is a flowchart of a first implementation of a data storage method according to an embodiment of the present application. The method may include:

S410, determining the data type of to-be-stored data when the to-be-stored data is obtained.

In some examples, when a user stores data in the above-mentioned data storage system, a data storage instruction may be sent to the above-mentioned data storage system, and the data storage instruction may include the to-be-stored data, and the data storage system may obtain the to-be-stored data when obtaining the data storage instruction.

In some examples, a user may send a data storage instruction to the data storage system using a terminal device, which may include a personal computer, a smart phone, or the like.

In some examples, the terminal device may call an application program interface of the data storage system to send the data storage instruction to the application program interface, through which the data storage system may obtain the data storage instruction.

In some other examples, the data storage instruction may further include the data type identifier of the to-be-stored data, and then the above-mentioned data storage system may, after acquiring the to-be-stored data, determine the data type of the to-be-stored data based on the data type identifier of the to-be-stored data. Wherein, when the data storage instruction includes the data type identifier of the to-be-stored data, then the data type of the to-be-stored data can be obtained by obtaining the data type identifier of the to-be-stored data. Therefore, the above-mentioned step of determining the data type of the to-be-stored data based on the data type identifier of the to-be-stored data is the step of "acquiring the data type of the to-be-stored data based on the data type identifier of the to-be-stored data". In this way, the action of determining is not really performed, as long as the data type of the to-be-stored data is known.

S420, determining a target storage area with a data type same as that of the to-be-stored data based on the data type of data stored in each storage area in the SMR disk.

S430, determining in the target storage area a target storage block into which the to-be-stored data is to be written.

After the above-mentioned data storage system determines the data type of the to-be-stored data, in order to store the to-be-stored data according to the data type thereof, the target storage area with a data type same as that of the to-be-stored data can be determined based on the data type of the data stored in each storage area in the SMR disk, and then the target storage block can be determined from the target storage area.

Wherein, the so-called target storage area with a data type same as that of the to-be-stored data refers to a target storage area which contains stored data with a data type same as that of the to-be-stored data. That is, the data type of the data stored in the target storage area is the same as the data type of the to-be-stored data.

For example, when the storage areas of the SMR disk contain at least one storage area which contains stored data with a data type same as that of the to-be-stored data, one storage area can be selected from the at least one storage area as the target storage area. In some examples, a storage area that still has available storage blocks can be selected as the target storage area from the at least one storage area.

After determining the target storage area, the above data storage system may select a storage block in the target storage area as the target storage block for the to-be-stored data. For example, a free storage block in the target storage area is taken as the target storage block.

S440, generating the main index information and backup index information of the to-be-stored data based on an identifier of the target storage block;

S450, generating the database index information of the to-be-stored data based on the to-be-stored data and the identifier of the target storage block;

S460, writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

After determining the target storage area and the target storage block, in order to enable subsequent reading of the to-be-stored data, the main index information and backup index information of the to-be-stored data can be generated based on the identifier of the target storage block. The database index information of the to-be-stored data can be generated based on the to-be-stored data and the identifier of the target storage block.

The so-called main index information and backup index information are consistent in content and mutually backed up, and can be configured for locating stored data to be queried in the SMR disk.

In some examples, when generating the main index information and backup index information of the to-be-stored data based on the identifier of the target storage block, the information such as the identifier of the target storage block, the identifier of the target storage area where the target storage block is located, the data type identifier of the to-be-stored data, the data volume of the to-be-stored data and the storage area for the to-be-stored data in the target storage block, etc. can be determined, so that the main index information and backup index information of the to-be-stored data are generated by using the various types of information determined above.

In addition, the SMR disk may serve as a hardware support for a database, so that the database can correspond to at least one SMR disk. For example, for a distributed database, the distributed database may correspond to multiple SMR disks, and the storage of data in the distributed database means that data is stored in multiple SMR disks corresponding to the distributed database. Therefore, when querying the stored data in the distributed database, it is necessary to determine in which SMR disk of the multiple SMR disks corresponding to the distributed database the data is stored.

Based on this, it is necessary to generate database index information of the to-be-stored data, which can be used to query the stored data in the SMR disk corresponding to the database.

In some examples, when generating database index information of the to-be-stored data based on the to-be-stored data and the identifier of the target storage block, an unit key may be obtained for the-to-be-stored data from the above data storage instruction first, and then the database index information of the to-be-stored data can be generated based on the unit key of the to-be-stored data and the identifier of the target storage block. The identifier of the target storage block may be the sequence number of the target storage block in the SMR area.

For example, after determining the unit key of the to-be-stored data and the identifier of the target storage block, the information such as the identifier of the SMR disk, the identifier of the target storage area where the target storage block is located, the data type identifier of the to-be-stored data, the data volume of the to-be-stored data and the storage area of the to-be-stored data in the target storage block, etc. can be determined, so that the database index information of the to-be-stored data is generated by using the various types of information determined above.

Wherein, since the serial number of the storage block in the SMR area is calculated through statistics according to the number of storage blocks in this SMR area, for example, the maximum serial number of the storage block is the total number of all storage blocks in this SMR area. Therefore, when generating the database index information, it is not necessary to use the identifier information of the storage area.

That is to say, in other examples, the sequence number of the storage block in the SMR area can be used to generate the database index information for generating the to-be-stored data. In this way, when generating the database index information of the to-be-stored data, it is possible not to use identifier information of the target storage area where the target data block is located.

In some examples, the above-mentioned data storage system may employ a three-level index, including a database index, a main index, and a backup index. Wherein, the database index is a first-level index, the main index is a second-level index, and the backup index is a third-level index.

Based on this, after generating the main index information, backup index information and database index information of the to-be-stored data, the database index information of the to-be-stored data can be stored in the above non-SMR disk, the to-be-stored data and the backup index information of the to-be-stored data can be stored in a storage block in the storage area of the SMR disk, and the main index information can be stored in the CMR area of the SMR disk or in the non-SMR disk.

In some examples, the target storage block may include a target object block and a target index block, the target index block is adjacent to the target object block. Based on this, the backup index information of the to-be-stored data can be stored in the target index block, and the to-be-stored data can be stored in the target object block.

After the main index information, the backup index information and the database index information of the to-be-stored data are generated, the to-be-stored data and the backup index information of the to-be-stored data can be written into the target storage block, the main index information of the to-be-stored data can be written into the CMR area or the non-SMR disk, and the database index information of the to-be-stored data can be written into the non-SMR disk, so that the to-be-stored data can be stored for convenient subsequent reading.

In still other examples, there may be one or more SMR disks in the data storage system. When there are multiple SMR disks, in order to ensure data consistency and avoid storing the same data on multiple SMR disks, here, when generating the database index information of the to-be-stored data, the database index information of the to-be-stored data can be generated based on the unit key of the to-be-stored data, WWN (World Wide Name, the global unique identifier of hardware) of the SMR disk and the identifier of the target storage block.

In order to describe the embodiments of the present application more clearly, video data and video index data are used as the to-be-stored data as an example in the description here.

Assuming that the to-be-stored data acquired by the data storage system is video data, a target storage area with a data type same as that of the video data can be determined based on the data type of the data stored in each storage area in the SMR disk, and then in the target storage area with the data type same as that of the video data, one storage block is determined as the target storage block for storing the video data. Wherein, the so-called target storage area with a data type same as that of the video data refers to a storage area, in storage areas of the SMR disk, which contains stored data with a data type same as that of the video data. Finally, the video data can be stored in the target object block of the target storage block of the video data, and the backup index information of the video data can be stored in the target index block after the target object block for the video data. For example, the storage area for storing the video data may be a storage area shown in FIG. 5a. In the storage area, there are N-1 storage blocks in total, each of which stores one item of video data, so N-1 items of video data can be stored.

Assuming that the to-be-stored data acquired by the data storage system is video index data, a target storage area with a data type same as that of the video index data can be determined based on the data type of the data stored in each storage area in the SMR disk, and then in the target storage area with a data type same as that of the video index data, one storage block is determined as the target storage block for storing the video index data. Wherein, the so-called target storage area with a data type same as that of the video index data refers to a storage area, in the storage areas of the SMR disk, which contains stored data with a data type same as that of the video index data. Finally, the video index data can be stored in the target object block of the target storage block for the video index data, and the backup index information of the video index data can be stored in a target index block after the target object block for the video index data. For example, the storage area for storing the video index data may be a storage area shown in FIG. 5b. In the storage area, there are N-1 storage blocks in total, each of which stores one item of video index data, so N-1 items of video index data can be stored.

In the data storage method provided by the embodiments of the present application, when to-be-stored data is obtained, the data type of the to-be-stored data can be determined; a target storage area with a data type same as that of the to-be-stored data can be determined based on the data type of the data stored in each storage area in the SMR disk; a target storage block into which the to-be-stored data is to be written is determined in the target storage area; after the target storage area is determined, main index information and backup index information of the to-be-stored data can be generated based on the identifier of the target storage block; database index information of the to-be-stored data is generated based on the to-be-stored data and the identifier of the target storage block; and finally, the to-be-stored data and the backup index information of the to-be-stored data can be written into the target storage block, the main index information of the to-be-stored data can be written into the CMR area or the non-SMR disk, and the database index information of the to-be-stored data can be written into the non-SMR disk. In this way, the data of the same data type can be stored in the same storage area. Since the data of the same data type usually has the same or similar frequency of overwriting operations, the storage of data with the same or similar overwriting operations in the same storage area can facilitate timely recycling of fragments generated in the storage area according to the frequency of overwriting operations of the data to reduce the number of fragments, thereby improving the storage resource utilization of the SMR disk.

Wherein, the main index information of the to-be-stored data is written into the CMR area or non-SMR disk, and the database index information of the to-be-stored data is written into the non-SMR disk. Since the CMR area or non-SMR disk supports delete operations, when the main index information and database index information of the to-be-stored data are updated, the main index information stored in the CMR area or the non-SMR disk and the database index information stored in the non-SMR disk can be directly located, thereby updating the stored main index information and the database index information without frequent overwriting operations on the main index information and database index information, thus, the invalid data in the SMR disk can be greatly reduced, and the storage resource utilization of the SMR disk can be improved.

On the basis of the data storage method shown in FIG. 4, an embodiment of the present application further provides a possible implementation. As shown in FIG. 6, it is a flowchart of the second implementation of the data storage method according to an embodiment of the present application, the method may include:

S610, determining the data type of to-be-stored data when the to-be-stored data is obtained.

S620: determining whether storage areas storing data contain a storage area which contains stored data with a data type same as that of the to-be-stored data; if so, performing step S630, otherwise, performing step S640.

S630: using a storage area which contains stored data with a data type same as that of the to-be-stored data as the target storage area.

S640, selecting a free storage area in the SMR disk as the target storage area.

In some examples, the data type of the data stored in the above-mentioned storage areas storing data may be the same as the data type of the to-be-stored data, or may be different from the data type of the to-be-stored data. It can be determined whether storage areas storing data contain a storage area which contains stored data with a data type same as that of the to-be-stored data based on the data type identifier of the data stored in each storage area storing data and the data type identifier of the to-be-stored data.

When the storage areas storing data contains a storage area which contains stored data with a data type same as that of the to-be-stored data, the storage area which contains stored data with a data type same as that of the to-be-stored data can be used as the target storage area.

That is to say, after determining the data type of the to-be-stored data, for each storage area storing data, the data type of the data stored in each storage area can be determined, so as to determine whether the data types of the data stored in each storage area contains a data type that is the same as the data type of the to-be-stored data. If so, using the storage area storing the data with the data type of the to-be-stored data as the target storage area.

In some examples, when there are multiple storage areas storing the stored data with a data type same as that of the to-be-stored data, a storage area having a free storage block can be selected as the target storage area from the multiple storage areas storing the stored data with a data type same as that of the to-be-stored data.

When there is no storage area which contains stored data with a data type same as that of the to-be-stored data, it means that the data type of the to-be-stored data is different from the data type of the data stored in any one storage block in the storage areas storing data. At this time, a free storage area can be selected as the target storage area. Then, the to-be-stored data can be stored in the target storage block of the free storage area through subsequent steps, and the data type stored in the free storage area can be marked as the data type of the to-be-stored data. Finally, the data type marked for the free storage area can be stored in the main metadata area for subsequent query.

S650, determining in the target storage area a target storage block into which the to-be-stored data is to be written.

S660, generating main index information and backup index information of the to-be-stored data based on an identifier of the target storage block;

S670, generating database index information of the to-be-stored data based on the to-be-stored data and the identifier of the target storage block;

S680, writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

Through the embodiments of the present application, when the data types of data stored in the storage areas storing data are all different from the data type of the to-be-stored data, a target storage area can be determined for the to-be-stored data, so that the following steps can be used to achieve the storage of the to-be-stored data.

Wherein, steps S610, S650-S680 in the embodiment of the present application are the same as steps SS410, S430-S460 in the first implementation, and are not repeated here.

Figure 7:
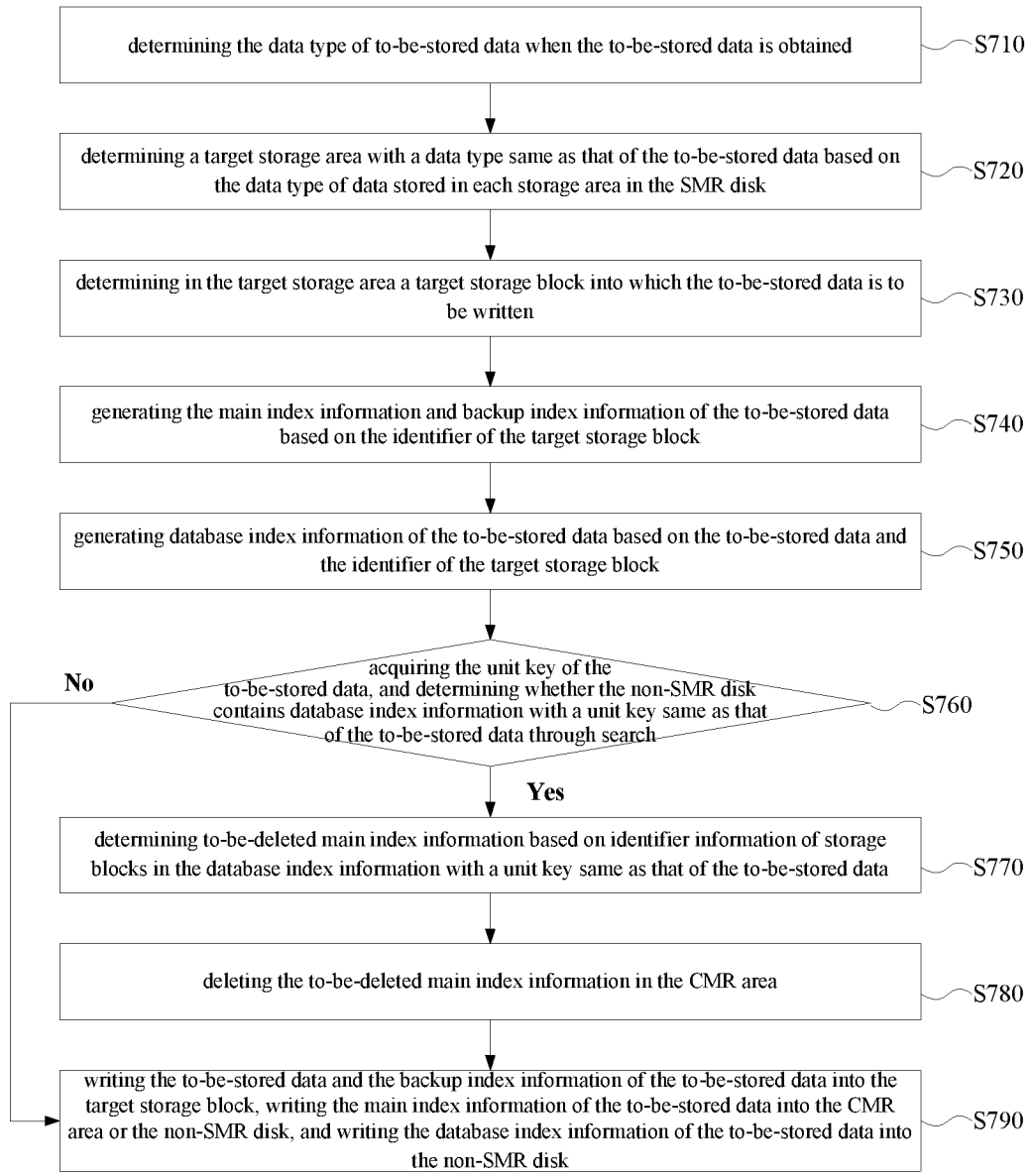
FIG. 7 is a flowchart of a third implementation of a data storage method according to an embodiment of the present application.

On the basis of the data storage method shown in FIG. 4, an embodiment of the present application further provides a possible implementation. As shown in FIG. 7, it is a flowchart of the third implementation of the data storage method according to the embodiment of the present application, the method may include:

S710, determining the data type of to-be-stored data when the to-be-stored data is obtained;

S720, determining a target storage area with a data type same as that of the to-be-stored data based on the data type of data stored in each storage area in the SMR disk;

S730, determining in the target storage area a target storage block into which the to-be-stored data is to be written;

S740, generating the main index information and backup index information of the to-be-stored data based on the identifier of the target storage block;

S750, generating database index information of the to-be-stored data based on the to-be-stored data and the identifier of the target storage block;

S760, acquiring the unit key of the to-be-stored data, and determining whether the non-SMR disk contains database index information with a unit key same as that of the to-be-stored data through search; if so, performing step S770;

S770, determining to-be-deleted main index information based on identifier information of storage blocks in the database index information with a unit key same as that of the to-be-stored data;

S780, deleting the to-be-deleted main index information in the CMR area.

In some examples, the to-be-stored data may be data stored in the storage area for the first time, or may be data for updating the data already stored in the storage area.

In order to determine whether the to-be-stored data is stored in a to-be-stored area for the first time, the unit key of the to-be-stored data may be obtained first. In some examples, when the to-be-stored data is stored in a database, the to-be-stored data may be stored in the form of key-value pairs, and at this time, the database may assign a unit key for the to-be-stored data. It can be understood that the database exists in the form of software based on the SMR disk and the non-SMR disk in the storage system.

After acquiring a unit key of the to-be-stored data, it can be determined whether the non-SMR disk contains database index information with a unit key same as that of the to-be-stored data. When there is database index information with a unit key same as that of the to-be-stored data, it means that the to-be-stored data is the data for updating the data stored in the SMR disk. When there is no database index information with a unit key same as that of the to-be-stored data, it means that the to-be-stored data is stored in the SMR disk for the first time. Then step S790 can be directly performed.

Wherein, for each stored data, since the unit key of the stored data can be used to generate the database index information of the stored data, each database index information stored in the non-SMR disk may include the unit key of the stored data corresponding to the database index information. That is, the unit key exists in each database index information stored in the non-SMR disk. Based on this, the so-called database index information with a unit key same as that of the to-be-stored data refers to the database index information in which the existing unit key is the same as the unit key of the to-be-stored data.

In some examples, in order to ensure that after using the to-be-stored data to update the data already stored in the storage area, the main index information of the data is unique. When it is determined that there is database index information with a unit key same as that of the to-be-stored data in the non-SMR disk, the to-be-deleted main index information may be determined based on the identifier information of the storage block in the database index information with a unit key same as that of the to-be-stored data.

For example, after determining that there is database index information with a unit key same as that of the to-be-stored data in the non-SMR disk, it is possible to determine, based on the unit key of the to-be-stored data, the identifier of the storage block storing the same data as the to-be-stored data, and then the corresponding storage block. Since the backup index information and the main index information stored in the storage block are mutually backed up, after obtaining the backup index information stored in the storage block, the to-be-deleted main index information can be determined. The stored data corresponding to the to-be-deleted main index information is data updated by using the to-be-stored data. After determining the to-be-deleted main index information, when the to-be-deleted main index information is stored in the CMR area of the SMR disk, the to-be-deleted main index information stored in the CMR area can be deleted, and when the to-be-deleted main index information is stored in the non-SMR disk, the to-be-deleted main index information stored in the non-SMR disk can be deleted. Thereby, the uniqueness of the main index information can be guaranteed. It is avoided to acquire pre-update data.

S790, writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

In some examples, the aforementioned storage area may be provided with states, which may include an free state, a busy state, and a fully loaded state. When the above-mentioned data storage system determines the target storage area, the state of the target storage area may be set to a busy state, so as to avoid determining the target storage area as the storage area for other to-be-stored data. After writing the to-be-stored data into the target storage block in the target storage area, it can be determined whether the storage in the target storage area is full. If the storage is full, the state of the target storage area can be set to a full loaded state, which can indicate that the number of storage blocks in the target storage area that can store data is 0. If the target storage area is not yet full of data, the state of the target storage area may be set to a free state, so as to determine the target storage area for other to-be-stored data.

It can be understood that steps S710-S750, S790 in the embodiment of the present application are the same as steps S410-S450, S460 in the first implementation, and are not repeated here.

Figure 8:
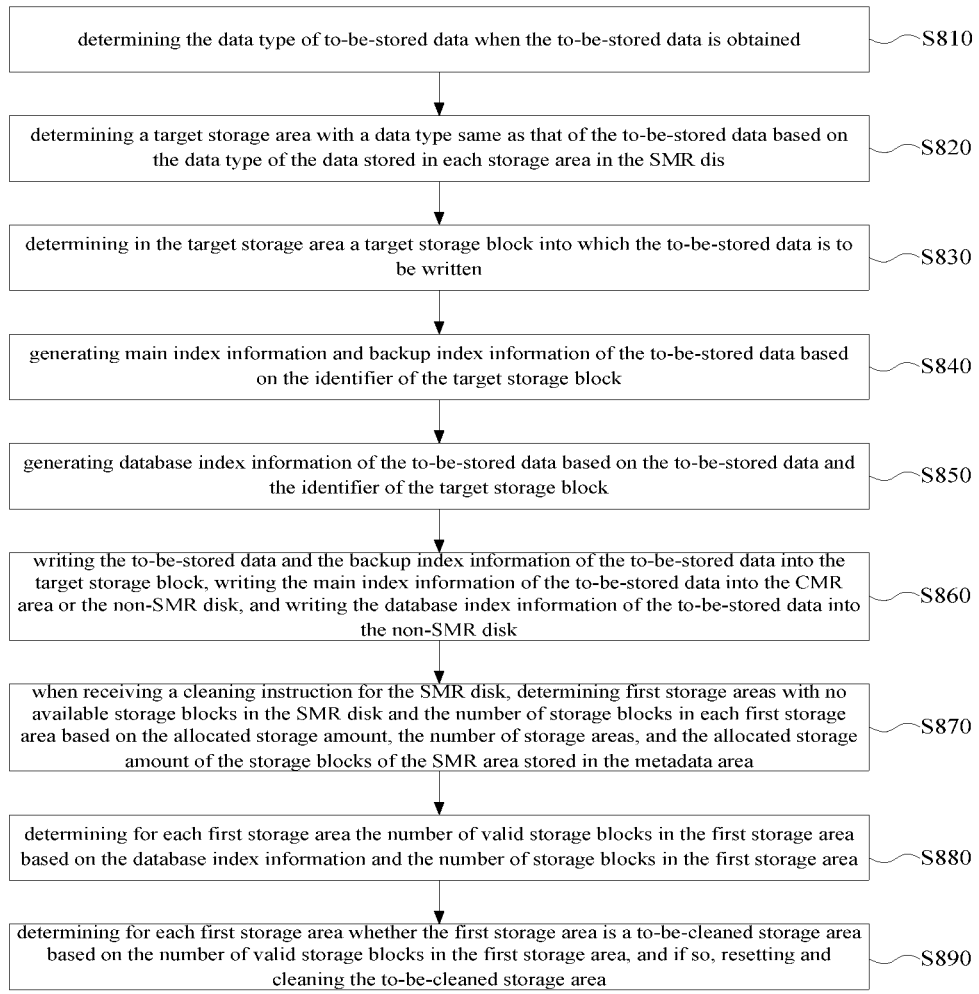
FIG. 8 is a flowchart of a fourth implementation of a data storage method according to an embodiment of the present application.

On the basis of the data storage method shown in FIG. 4, an embodiment of the present application further provides a possible implementation. As shown in FIG. 8, it is a flowchart of the fourth implementation of the data storage method according to the embodiment of the present application, the method may include:

S810, determining the data type of to-be-stored data when the to-be-stored data is obtained;

S820, determining a target storage area with a data type same as that of the to-be-stored data based on the data type of the data stored in each storage area in the SMR disk;

S830, determining in the target storage area a target storage block into which the to-be-stored data is to be written;

S840, generating main index information and backup index information of the to-be-stored data based on the identifier of the target storage block;

S850, generating database index information of the to-be-stored data based on the to-be-stored data and the identifier of the target storage block;

S860, writing the to-be-stored data and the backup index information of the to-be-stored data into the target storage block, writing the main index information of the to-be-stored data into the CMR area or the non-SMR disk, and writing the database index information of the to-be-stored data into the non-SMR disk;

S870, when receiving a cleaning instruction for the SMR disk, determining first storage areas with no available storage blocks in the SMR disk and the number of storage blocks in each first storage area based on the allocated storage amount, the number of storage areas, and the allocated storage amount of the storage blocks of the SMR area stored in the metadata area.

S880, determining for each first storage area the number of valid storage blocks in the first storage area based on the database index information and the number of storage blocks in the first storage area, wherein the data stored in the valid storage block is valid data.

S890, determining for each first storage area whether the first storage area is a to-be-cleaned storage area based on the number of valid storage blocks in the first storage area, and if so, resetting and cleaning the to-be-cleaned storage area.

In some examples, after the to-be-stored data is stored according to different data types, the update frequency of some data is high, and the update frequency of some data is low. For example, after storing the video data in the storage area, it is not necessary to be updated, however, after storing the video index data in the storage area, it is usually updated frequently. Since in the prior art, when updating the video index data, it is usually to re-select a storage block in the storage area of the video index data to store the updated video index data, and the database index information is generated based on the identifier of the re-selected storage block, the storage block storing the video index data before the update becomes an invalid storage block. When performing multiple updates, there will be many invalid storage blocks in the storage areas for video index data. In order to utilize the storage space of the SMR disk more effectively, the invalid storage block may be reset and recycled.

Wherein, the so-called resetting and cleaning of the to-be-cleaned storage area refers to cleaning the data in the to-be-cleaned storage area, so as to reset the to-be-cleaned storage area, and realize the recycling of the to-be-cleaned storage area.

In some examples, the user may send a cleaning instruction to the data storage system using a terminal device. After receiving the cleaning instruction, the data storage system can determine the to-be-cleaned storage area, and then reset and clean the to-be-cleaned storage area.

In some examples, the CMR area may include a metadata area, which may store the allocated storage amount of the SMR area, the number of storage areas, and the allocated storage amount of the storage blocks, wherein the allocated storage amount of the SMR area is the total size allocated to the SMR area, and the allocated storage amount of the storage blocks is the size allocated to each storage block.

The above-mentioned data storage system can calculate the size of each storage area based on the allocated storage amount and the number of storage areas of the SMR area, and then can calculate the number of storage blocks in the storage area based on the size of each storage area and the allocated storage amount of the storage blocks.

After the above-mentioned data storage system calculates the number of storage blocks in each storage area, for each storage area, the number of storage blocks in the storage area storing data can be calculated through statistics, and then it can be determined, based on the number of storage blocks in each storage area and the number of storage blocks in the storage area storing data, whether the number of available storage blocks in the storage area is 0, if it is 0, the storage areas with no available storage block can be used as first storage areas. In this way, all the first storage areas in the SMR area and the number of storage blocks in each first storage area can be obtained.

Then, the above-mentioned data storage system may, for each first storage area, determine the storage blocks with database index information in the first storage area based on the database index information and the number of storage blocks in the first storage area, and then may determine the storage block with the database index information as a valid storage block in the first storage area, so that the number of valid storage blocks in the first storage area can be obtained by statistics.

Finally, it may be determined for each first storage area whether the first storage area is a to-be-cleaned storage area based on the number of valid storage blocks in the first storage area. For example, when the number of valid storage blocks in the first storage area is less than a preset cleaning threshold, the first storage area may be determined as the to-be-cleaned storage area. Then the to-be-cleaned storage area can be reset and cleaned, so as to realize the timely recycling of the storage area and improve the utilization rate of the storage space of the SMR disk.

In some examples, when resetting and recycling the to-be-cleaned storage area, valid data may also be stored in the to-be-cleaned storage area. In order to avoid resetting the valid data stored in the valid storage blocks, the number of valid storage blocks in the to-be-cleaned storage area can be calculated through statistics for each to-be-cleaned storage area. When the number of valid storage blocks in the to-be-cleaned storage area is not 0, the data type of to-be-copied data stored in the to-be-cleaned storage area can be determined, that is, the data type of the stored valid data. That is to say, when the number of valid storage blocks in the to-be-cleaned storage area is not 0, the valid data stored in the valid storage blocks in the to-be-cleaned storage area can be used as the to-be-copied data. Then, a target paste storage area with a data type same as that of the to-be-copied data can be determined based on the data type of the data stored in each storage area except the to-be-cleaned storage area in the SMR disk, so as to transfer the valid data to the target paste storage area.

Wherein, the so-called target paste storage area with a data type same as that of the to-be-copied data refers to a target paste storage area, in storage areas except the cleaning storage area in the SMR disk, which contains stored data with a data type same as that of the to-be-copied data. That is, the determined target paste storage area is a storage area other than the cleaning storage area in the SMR disk, and the data type of the data stored in this storage area is the same as the data type of the to-be-copied data.

After determining the target paste storage area, a target paste storage block into which the to-be-copied data is to be pasted can be determined in the target paste storage area. Then, the main index information and backup index information of the to-be-copied data may be generated based on the identifier of the target paste storage block, and the database index information of the to-be-copied data may be generated based on the to-be-copied data and the identifier of the target paste storage block.

Finally, the to-be-copied data in the valid storage block can be copied, the backup index information of the to-be-copied data and the copied to-be-copied data can be written into the target paste storage block, the main index information of the to-be-copied data can be written into the CMR area or the non-SMR disk, and the database index information of the to-be-copied data can be written into the non-SMR disk. In this way, the valid data stored in the to-be-cleaned storage area can be transferred to the storage area with a data type same as that of the valid data, so that the valid data can be avoided from being cleaned.

In still other examples, after the valid data is transferred, in order to make the valid data have a unique database index, before copying the to-be-copied data in the valid storage block, the database index information with a unit key same as that of the to-be-copied data in the non-SMR disk can also be deleted.

The so-called database index information in the non-SMR disk with a unit key same as that of the to-be-copied data refers to the database index information with a unit key same as the unit key of the to-be-copied data in each database index information stored in the non-SMR disk.

Figure 9:
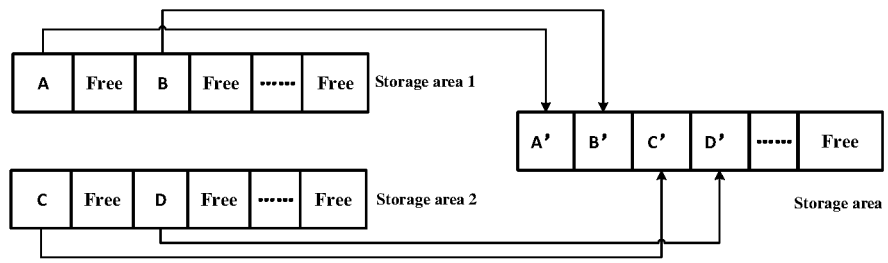
FIG. 9 is a schematic diagram of a data transfer process in a data storage method shown in FIG. 8.

For example, it is assumed that the to-be-cleaned storage areas determined through the above steps are storage area 1 and storage area 2 shown in FIG. 9, wherein storage block A and storage block B in the storage area 1 are to-be-copied storage blocks, and storage block C and storage block D in the storage area 2 are also to-be-copied storage blocks. Assuming that the data types of the data stored in the storage area 1 and the storage area 2 are the same, it can be determined that the target paste storage area is storage area 3. Then, to-be-pasted storage blocks can be determined in the storage area 3 for the storage block A, the storage block B, the storage block C and the storage block D respectively. It is assumed that the to-be-pasted storage block determined for the storage block A is storage block A', the to-be-pasted storage block determined for the storage block B is storage block B', the to-be-pasted storage block determined for the storage block C is storage block C', and the to-be-pasted storage block determined for the storage block D is storage block D'. Then, the data stored in the storage block A can be copied and pasted to the storage block A', the data stored in the storage block B can be copied and pasted to the storage block B', the data stored in the storage block C can be copied and pasted to the storage block C', the data stored in the storage block D can be copied and pasted to the storage block D'. Finally, the storage area 1 and the storage area 2 are reset and cleaned.

The steps S810 to S860 in the embodiment of the present application are the same as the steps S410 to S460 in the first implementation, and are not repeated here.

Figure 10:
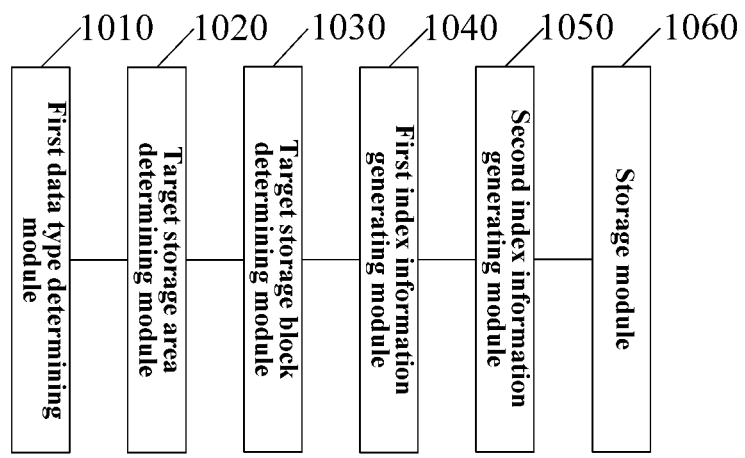
FIG. 10 is a schematic structural diagram of a data storage apparatus according to an embodiment of the application.

Corresponding to the above method embodiments, an embodiment of the present application further provides a data storage apparatus, which can be applied to a shingled magnetic recording SMR storage system. The SMR storage system includes an SMR disk and a non-SMR disk; the SMR disk includes a traditional magnetic recording CMR area and an SMR area. The SMR area includes multiple storage areas, each of which is logically divided into multiple storage blocks. Referring to FIG. 10, the apparatus may include:

a first data type determining module 1010, configured for determining a data type of the to-be-stored data when the to-be-stored data is obtained;

a target storage area determining module 1020, configured for determining a target storage area with a data type same as that of the to-be-stored data based on a data type of data stored in each storage area in the SMR disk;

a target storage block determining module 1030, configured for determining in the target storage area a target storage block into which the to-be-stored data is to be written;

a first index information generating module 1040, configured for generating main index information and backup index information of the to-be-stored data based on an identifier of the target storage block;

a second index information generating module 1050, configured for generating database index information of the to-be-stored data based on the to-be-stored data and the identifier of the target storage block;

a storage module 1060, configured for writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

In the data storage apparatus provided by the embodiments of the present application, the data type of to-be-stored data can be determined when the to-be-stored data is obtained; a target storage area with a data type same as that of the to-be-stored data can be determined based on the data type of the data stored in each storage area in the SMR disk; a target storage block into which the to-be-stored data is to be written is determined in the target storage area; after the target storage area is determined, main index information and backup index information of the to-be-stored data can be generated based on the identifier of the target storage block; database index information of the to-be-stored data is generated based on the to-be-stored data and the identifier of the target storage block; and finally, the to-be-stored data and the backup index information of the to-be-stored data can be written into the target storage block, the main index information of the to-be-stored data can be written into the CMR area or the non-SMR disk, and the database index information of the to-be-stored data can be written into the non-SMR disk. In this way, the data of the same data type can be stored in the same storage area. Since the data of the same data type usually has the same or similar frequency of overwriting operations, the storage of data with the same or similar overwriting operations in the same storage area can facilitate timely recycling of fragments generated in the storage area according to the frequency of overwriting operations of the data to reduce the number of fragments, thereby improving the storage resource utilization of the SMR disk.

Wherein, the main index information of the data-to-be-stored is written into the CMR area or non-SMR disk, and the database index information of the data-to-be-stored is written into the non-SMR disk. Since the CMR area or non-SMR disk supports delete operations, when the main index information and database index information of the data-to-be-stored are updated, the main index information stored in the CMR area or the non-SMR disk and the database index information stored in the non-SMR disk can be directly located, thereby updating the stored main index information and the database index information without frequent overwriting operations on the main index information and database index information, thus, the invalid data in the SMR disk can be greatly reduced, and the storage resource utilization of the SMR disk can be improved.

In some examples, the target storage area determining module 1020 may include a judging submodule, configured for determining whether storage areas storing data contain a storage area which contains stored data with a data type same as that of the to-be-stored data; if so, triggering a first target storage area determining submodule; if not, triggering a second target storage area determining submodule; the first target storage area determining submodule is configured for using the storage area which contains stored data with a data type same as that of the to-be-stored data as the target storage area; the second target storage area determining submodule is configured for selecting a free storage area in the SMR disk as the target storage area.

In some examples, the CMR area includes a metadata area which stores a data type identifier of data stored in each storage area storing data; the first data type determining module 1010 includes: a first data type identifier acquiring submodule, configured for acquiring the to-be-stored data and a data type identifier of the to-be-stored data received through an application program interface; a first data type determining submodule, configured for determining the data type of the to-be-stored data based on the data type identifier of the to-be-stored data; wherein the judging submodule is specifically configured for: determining whether storage areas storing data contain a storage area which contains stored data with a data type same as that of the to-be-stored data based on the data type identifier of the data stored in each storage area storing data and the data type identifier of the to-be-stored data.

In some examples, the data storage apparatus may further include a searching module, configured for acquiring a unit key of the to-be-stored data, and determining whether the non-SMR disk contains database index information with a unit key same as that of the to-be-stored data through search; if so, triggering a to-be-deleted information determining module, wherein the to-be-deleted information determining module is configured for determining to-be-deleted main index information based on identifier information of storage blocks in the database index information with a unit key same as that of the to-be-stored data; if not, triggering a first deleting module which is configured for deleting the to-be-deleted main index information in the CMR area.

In some examples, the CMR area includes a metadata area; and the data storage apparatus may further include: a first storage area determining module, configured for determining, when receiving a cleaning instruction for the SMR disk, first storage areas with no available storage block in the SMR disk and the number of storage blocks in each first storage area of the first storage areas based on the number of storage areas, and the allocated storage amount of the storage blocks, the allocated storage amount of the SMR area stored in the metadata area; a valid data block number determining module, configured for determining for each first storage area the number of valid storage blocks in the first storage area based on the database index information and the number of storage blocks in the first storage area, wherein data stored in the valid storage block is valid data;

a to-be-cleaned storage area determining module, configured for determining for each first storage area whether the first storage area is a to-be-cleaned storage area based on the number of valid storage blocks in the first storage area, and if the first storage area is a to-be-cleaned storage area, triggering a cleaning module which is configured for resetting and cleaning the to-be-cleaned storage area.

In some examples, the cleaning module may include: a second data type determining module, configured for determining a data type of to-be-copied data stored in the to-be-cleaned storage area when the number of valid storage blocks in the to-be-cleaned storage area is not 0; a target paste storage area determining module, configured for determining a target paste storage area with a data type same as that of the to-be-copied data based on a data type of data stored in each storage area except the to-be-cleaned storage area in the SMR disk; a target paste storage block determining module, configured for determining in the target paste storage area a target paste storage block into which the to-be-copied data is to be pasted; a third index information determining module, configured for generating main index information and backup index information of the to-be-copied data based on an identifier of the target paste storage block; a fourth index information determining module, configured for generating database index information of the to-be-copied data based on the to-be-copied data and the identifier of the target paste storage block; a paste module, configured for copying the to-be-copied data in the valid storage block, writing the backup index information of the to-be-copied data and the copied to-be-copied data into the target paste storage block, writing the main index information of the to-be-copied data into the CMR area or non SMR disk, and writing the database index information of the to-be-copied data into the non-SMR disk.

In some examples, the data storage apparatus may also include a second deleting module for deleting database index information with a unit key same as that of to-be-copied data in the non-SMR disk.

In some examples, the to-be-stored data includes video data and/or video index data; the first data type determining module 1010 is specifically configured for determining a data type of the video data when the video data is obtained; and/or determining a data type of the video index data when the video index data is obtained; the target storage area determining module 1020 is specifically configured for determining a target storage area with a data type same as that of the video data based on the data type of data stored in each storage area in the SMR disk; and/or determining a target storage area with a data type same as that of the video index data based on the data type of data stored in each storage area in the SMR disk.

Figure 11:
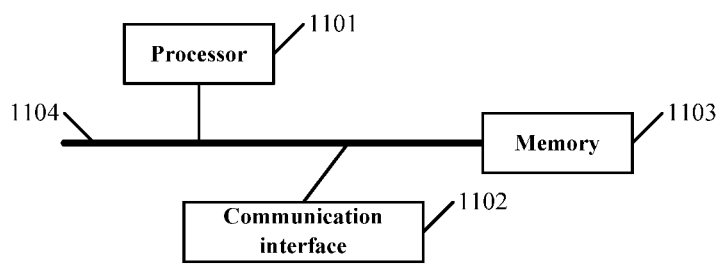
FIG. 11 is a schematic structural diagram of an electronic device according to an embodiment of the present application.

An embodiment of the application further provides an electronic device, as shown in FIG. 11, including a processor 1101, a communication interface 1102, a memory 1103 and a communication bus 1104, wherein the processor 1101, the communication interface 1102 and the memory 1103 communicate with each other through the communication bus 1104; the memory 1103 is configured for storing computer program; the processor 1101 is configured for implement the following method steps when executing the program stored on the memory 1103: determining a data type of to-be-stored data when the to-be-stored data is obtained; determining a target storage area with a data type same as that of the to-be-stored data based on a data type of data stored in each storage area in the SMR disk; determining in the target storage area a target storage block into which the to-be-stored data is to be written; generating main index information and backup index information of the to-be-stored data based on an identifier of the target storage block; generating database index information of the to-be-stored data based on the to-be-stored data and the identifier of the target storage block; writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

In the electronic device provided by the embodiments of the present application, the data type of to-be-stored data can be determined when the to-be-stored data is obtained; a target storage area with a data type same as that of the to-be-stored data can be determined based on the data type of the data stored in each storage area in the SMR disk; a target storage block into which the to-be-stored data is to be written is determined in the target storage area; after the target storage area is determined, main index information and backup index information of the to-be-stored data can be generated based on the identifier of the target storage block; database index information of the to-be-stored data is generated based on the to-be-stored data and the identifier of the target storage block; and finally, the to-be-stored data and the backup index information of the to-be-stored data can be written into the target storage block, the main index information of the to-be-stored data can be written into the CMR area or the non-SMR disk, and the database index information of the to-be-stored data can be written into the non-SMR disk. In this way, the data of the same data type can be stored in the same storage area. Since the data of the same data type usually has the same or similar frequency of overwriting operations, the storage of data with the same or similar overwriting operations in the same storage area can facilitate timely recycling of fragments generated in the storage area according to the frequency of overwriting operations of the data to reduce the number of fragments, thereby improving the storage resource utilization of the SMR disk.

Wherein, the main index information of the to-be-stored data is written into the CMR area or non-SMR disk, and the database index information of the to-be-stored data is written into the non-SMR disk. Since the CMR area or non-SMR disk supports delete operations, when the main index information and database index information of the to-be-stored data are updated, the main index information stored in the CMR area or the non-SMR disk and the database index information stored in the non-SMR disk can be directly located, thereby updating the stored main index information and the database index information without frequent overwriting operations on the main index information and database index information, thus, the invalid data in the SMR disk can be greatly reduced, and the storage resource utilization of the SMR disk can be improved.

The communication bus 1104 aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.

The communications interface 1102 is configured for communications between the aforementioned electronic device and other devices.

The memory 1103 can include a random access memory (RAM), or can include a non-volatile memory (NVM), for example at least one disk memory. Optionally, the memory can also be at least one storage device located away from the processor described above.

The processor 1101 described above may be a general-purpose processor, such as a central processing unit (CPU), a network processor (NP), etc.; it may also be a digital signal processor (DSP), an application specific integrated circuit (ASIC), field-programmable gate array (FPGA) or other programmable logic devices, discrete gate or transistor logic devices, discrete hardware components.

The embodiment of the present application provides a computer readable storage medium. The computer readable storage medium stores computer program thereon which when executed by a processor, causes a processor to implement the following method steps:

determining a data type of to-be-stored data when the to-be-stored data is obtained;

determining a target storage area with a data type same as that of the to-be-stored data based on a data type of data stored in each storage area in the SMR disk;

determining in the target storage area a target storage block into which the to-be-stored data is to be written;

generating main index information and backup index information of the to-be-stored data based on an identifier of the target storage block;

generating database index information of the to-be-stored data based on the to-be-stored data and the identifier of the target storage block;

writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

In the computer readable storage medium provided by the embodiments of the present application, the data type of to-be-stored data can be determined when the to-be-stored data is obtained; a target storage area with a data type same as that of the to-be-stored data can be determined based on the data type of the data stored in each storage area in the SMR disk; a target storage block into which the to-be-stored data is to be written is determined in the target storage area; after the target storage area is determined, main index information and backup index information of the to-be-stored data can be generated based on the identifier of the target storage block; database index information of the to-be-stored data is generated based on the to-be-stored data and the identifier of the target storage block; and finally, the to-be-stored data and the backup index information of the to-be-stored data can be written into the target storage block, the main index information of the to-be-stored data can be written into the CMR area or the non-SMR disk, and the database index information of the to-be-stored data can be written into the non-SMR disk. In this way, the data of the same data type can be stored in the same storage area. Since the data of the same data type usually has the same or similar frequency of overwriting operations, the storage of data with the same or similar overwriting operations in the same storage area can facilitate timely recycling of fragments generated in the storage area according to the frequency of overwriting operations of the data to reduce the number of fragments, thereby improving the storage resource utilization of the SMR disk.

Wherein, the main index information of the to-be-stored data is written into the CMR area or non-SMR disk, and the database index information of the to-be-stored data is written into the non-SMR disk. Since the CMR area or non-SMR disk supports delete operations, when the main index information and database index information of the to-be-stored data are updated, the main index information stored in the CMR area or the non-SMR disk and the database index information stored in the non-SMR disk can be directly located, thereby updating the stored main index information and the database index information without frequent overwriting operations on the main index information and database index information, thus, the invalid data in the SMR disk can be greatly reduced, and the storage resource utilization of the SMR disk can be improved.

An embodiment of the present application further provides a computer program product containing instructions which, when executed by a processor, cause the processor to implement the embodiments of any data storage method according to the embodiments of the present application.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, for embodiments of apparatus, system, electronic device, computer readable storage medium, and computer program product, since they are substantially similar to the embodiments of the method, their description is relatively simple, and for the related aspects, one only needs to refer to portions of the description of the embodiments of the method.

The description is only for preferred embodiments of the present application, and is not intended to limit the present application. Any modifications, substitutions, improvements, etc., which are made within the spirit and principles of the present application, will fall into the protection scope of the present application.

What is claimed is:

1. A data storage method, which is applied to an SMR (shingled magnetic recording) storage system, wherein the SMR storage system comprises an SMR disk and a non-SMR disk; the SMR disk comprises a CMR (conventional magnetic recording) area and an SMR area, the SMR area comprises multiple storage areas, each of which is logically divided into multiple storage blocks; the method comprises:
   determining a data type of to-be-stored data when the to-be-stored data is obtained;
   determining a target storage area with a data type same as that of the to-be-stored data based on a data type of data stored in each storage area in the SMR disk;
   determining in the target storage area a target storage block into which the to-be-stored data is to be written;
   generating main index information and backup index information of the to-be-stored data based on an identifier of the target storage block;
   generating database index information of the to-be-stored data based on the to-be-stored data and the identifier of the target storage block;
   writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

2. The method of claim 1, wherein the step of determining a target storage area with a data type same as that of the to-be-stored data based on a data type of data stored in each storage area in the SMR disk comprises:
   determining whether storage areas storing data contain a storage area which contains stored data with a data type same as that of the to-be-stored data;
   if so, using the storage area which contains stored data with a data type same as that of the to-be-stored data as the target storage area;
   if not, selecting a free storage area in the SMR disk as the target storage area.

3. The method of claim 2, wherein the CMR area comprises a metadata area which stores a data type identifier of data stored in each storage area storing data; the step of determining a data type of to-be-stored data when the to-be-stored data is obtained comprises:
   acquiring the to-be-stored data and a data type identifier of the to-be-stored data received through an application program interface;
   determining the data type of the to-be-stored data based on the data type identifier of the to-be-stored data;
   determining whether storage areas storing data contain a storage area which contains stored data with a data type same as that of the to-be-stored data, comprises:
   determining whether storage areas storing data contain a storage area which contains stored data with a data type same as that of the to-be-stored data based on the data type identifier of the data stored in each storage area storing data and the data type identifier of the to-be-stored data.

4. The method of claim 1, wherein before writing the to-be-stored data and the backup index information of the to-be-stored data into the target storage block, the method further comprises:
   acquiring a unit key of the to-be-stored data, and determining whether the non-SMR disk contains database index information with a unit key same as that of the to-be-stored data through search;
   if so, determining to-be-deleted main index information based on identifier information of storage blocks in the database index information with a unit key same as that of the to-be-stored data;
   deleting the to-be-deleted main index information in the CMR area.

5. The method of claim 1, wherein the CMR area comprises a metadata area; after writing the to-be-stored data and the backup index information of the to-be-stored data into the target storage block, writing the main index information of the to-be-stored data into the CMR area or the non-SMR disk, and writing the database index information of the to-be-stored data into the non-SMR disk, the method further comprises:
   when receiving a cleaning instruction for the SMR disk, determining first storage areas with no available storage block in the SMR disk and the number of storage blocks in each first storage area of the first storage areas based on the number of storage areas, and an allocated storage amount of the storage blocks, an allocated storage amount of the SMR area stored in the metadata area;

determining for each first storage area the number of valid storage blocks in the first storage area based on the database index information and the number of storage blocks in the first storage area, wherein data stored in the valid storage block is valid data;

determining for each first storage area whether the first storage area is a to-be-cleaned storage area based on the number of valid storage blocks in the first storage area, and if the first storage area is a to-be-cleaned storage area, resetting and cleaning the to-be-cleaned storage area.

6. The method of claim 5, wherein resetting and cleaning the to-be-cleaned storage area comprises:

determining a data type of to-be-copied data stored in the to-be-cleaned storage area when the number of valid storage blocks in the to-be-cleaned storage area is not 0;

determining a target paste storage area with a data type same as that of the to-be-copied data based on a data type of data stored in each of storage areas except the to-be-cleaned storage area in the SMR disk;

determining in the target paste storage area a target paste storage block into which the to-be-copied data is to be pasted;

generating main index information and backup index information of the to-be-copied data based on an identifier of the target paste storage block;

generating database index information of the to-be-copied data based on the to-be-copied data and the identifier of the target paste storage block;

copying the to-be-copied data in the valid storage block, writing the backup index information of the to-be-copied data and the copied to-be-copied data into the target paste storage block, writing the main index information of the to-be-copied data into the CMR area or non SMR disk, and writing the database index information of the to-be-copied data into the non-SMR disk.

7. The method of claim 6, wherein before copying the to-be-copied data in the valid storage block, the method further comprises:

deleting database index information with a unit key same as that of the to-be-copied data in the non-SMR disk.

8. The method of claim 1, wherein the to-be-stored data comprises video data and/or video index data;

determining a data type of to-be-stored data when the to-be-stored data is obtained, comprises:

determining a data type of the video data when the video data is obtained; and/or determining a data type of the video index data when the video index data is obtained;

determining a target storage area with a data type same as that of the to-be-stored data based on a data type of data stored in each storage area in the SMR disk comprises:

determining a target storage area with a data type same as that of the video data based on the data type of data stored in each storage area in the SMR disk; and/or determining a target storage area with a data type same as that of the video index data based on the data type of data stored in each storage area in the SMR disk.

9. A non-transitory computer readable storage medium, wherein the computer readable storage medium stores computer program thereon which, when executed by a processor, causes the processor to implement steps of the method according to claim 1.

10. An SMR storage system, wherein the SMR storage system comprises an SMR disk, a non-SMR disk and a processor, the SMR disk comprises a CMR area and an SMR area, the SMR area comprises multiple storage areas, each of which is logically divided into multiple storage blocks;

the storage blocks are configured for storing to-be-stored data and backup index information of the to-be-stored data;

the CMR area is configured for storing main index information of the to-be-stored data;

the non-SMR disk is configured for storing database index information of the to-be-stored data;

the processor is configured for implementing the data storage method according to claim 1 at runtime.

11. An electronic device, wherein the electronic device comprises a processor, a communication interface, a memory and a communication bus, wherein the processor, the communication interface, and the memory communicate with each other via the communication bus;

the memory is configured for storing computer program;

the processor is configured for performing steps of a data storage method which is applied to an SMR (shingled magnetic recording) storage system when executing the program stored on the memory; wherein the SMR storage system comprises an SMR disk and a non-SMR disk; the SMR disk comprises a CMR (conventional magnetic recording) area and an SMR area, the SMR area comprises multiple storage areas, each of which is logically divided into multiple storage blocks; the method comprises:

determining a data type of to-be-stored data when the to-be-stored data is obtained;

determining a target storage area with a data type same as that of the to-be-stored data based on a data type of data stored in each storage area in the SMR disk;

determining in the target storage area a target storage block into which the to-be-stored data is to be written;

generating main index information and backup index information of the to-be-stored data based on an identifier of the target storage block;

generating database index information of the to-be-stored data based on the to-be-stored data and the identifier of the target storage block;

writing the to-be-stored data and the backup index information of the to-be-stored data into the target storage block, writing the main index information of the to-be-stored data into the CMR area or the non-SMR disk, and writing the database index information of the to-be-stored data into the non-SMR disk.

12. The electronic device of claim 11, wherein the step of determining a target storage area with a data type same as that of the to-be-stored data based on a data type of data stored in each storage area in the SMR disk comprises:

determining whether storage areas storing data contain a storage area which contains stored data with a data type same as that of the to-be-stored data;

if so, using the storage area which contains stored data with a data type same as that of the to-be-stored data as the target storage area;

if not, selecting a free storage area in the SMR disk as the target storage area.

13. The electronic device of claim 12, wherein the CMR area comprises a metadata area which stores a data type identifier of data stored in each storage area storing data; the step of determining a data type of to-be-stored data when the to-be-stored data is obtained comprises:
  acquiring the to-be-stored data and a data type identifier of the to-be-stored data received through an application program interface;
  determining the data type of the to-be-stored data based on the data type identifier of the to-be-stored data;
  determining whether storage areas storing data contain a storage area which contains stored data with a data type same as that of the to-be-stored data, comprises:
  determining whether storage areas storing data contain a storage area which contains stored data with a data type same as that of the to-be-stored data based on the data type identifier of the data stored in each storage area storing data and the data type identifier of the to-be-stored data.

14. The electronic device of claim 11, wherein before writing the to-be-stored data and the backup index information of the to-be-stored data into the target storage block, the method further comprises:
  acquiring a unit key of the to-be-stored data, and determining whether the non-SMR disk contains database index information with a unit key same as that of the to-be-stored data through search;
  if so, determining to-be-deleted main index information based on identifier information of storage blocks in the database index information with a unit key same as that of the to-be-stored data;
  deleting the to-be-deleted main index information in the CMR area.

15. The electronic device of claim 11, wherein the CMR area comprises a metadata area;
  after writing the to-be-stored data and the backup index information of the to-be-stored data into the target storage block, writing the main index information of the to-be-stored data into the CMR area or the non-SMR disk, and writing the database index information of the to-be-stored data into the non-SMR disk, the method further comprises:
  when receiving a cleaning instruction for the SMR disk, determining first storage areas with no available storage block in the SMR disk and the number of storage blocks in each first storage area of the first storage areas based on the number of storage areas, and an allocated storage amount of the storage blocks, an allocated storage amount of the SMR area stored in the metadata area;
  determining for each first storage area the number of valid storage blocks in the first storage area based on the database index information and the number of storage blocks in the first storage area, wherein data stored in the valid storage block is valid data;
  determining for each first storage area whether the first storage area is a to-be-cleaned storage area based on the number of valid storage blocks in the first storage area, and if the first storage area is a to-be-cleaned storage area, resetting and cleaning the to-be-cleaned storage area.

16. The electronic device of claim 15, wherein resetting and cleaning the to-be-cleaned storage area comprises:
  determining a data type of to-be-copied data stored in the to-be-cleaned storage area when the number of valid storage blocks in the to-be-cleaned storage area is not 0;
  determining a target paste storage area with a data type same as that of the to-be-copied data based on a data type of data stored in each of storage areas except the to-be-cleaned storage area in the SMR disk;
  determining in the target paste storage area a target paste storage block into which the to-be-copied data is to be pasted;
  generating main index information and backup index information of the to-be-copied data based on an identifier of the target paste storage block;
  generating database index information of the to-be-copied data based on the to-be-copied data and the identifier of the target paste storage block;
  copying the to-be-copied data in the valid storage block, writing the backup index information of the to-be-copied data and the copied to-be-copied data into the target paste storage block, writing the main index information of the to-be-copied data into the CMR area or non SMR disk, and writing the database index information of the to-be-copied data into the non-SMR disk.

17. The electronic device of claim 16, wherein before copying the to-be-copied data in the valid storage block, the method further comprises:
  deleting database index information with a unit key same as that of the to-be-copied data in the non-SMR disk.

18. The electronic device of claim 11, wherein the to-be-stored data comprises video data and/or video index data;
  determining a data type of to-be-stored data when the to-be-stored data is obtained, comprises:
  determining a data type of the video data when the video data is obtained; and/or
  determining a data type of the video index data when the video index data is obtained;
  determining a target storage area with a data type same as that of the to-be-stored data based on a data type of data stored in each storage area in the SMR disk comprises:
  determining a target storage area with a data type same as that of the video data based on the data type of data stored in each storage area in the SMR disk; and/or
  determining a target storage area with a data type same as that of the video index data based on the data type of data stored in each storage area in the SMR disk.

* * * * *